(12) United States Patent
Turner (10) Patent No.: US 7,593,026 B2
(45) Date of Patent: Sep. 22, 2009

(54) DYNAMIC DISPLAY OPTIMIZATION METHOD AND SYSTEM WITH IMAGE MOTION

(75) Inventor: James A. Turner, Binghamton, NY (US)

(73) Assignee: L-3 Communications Corporation, New York, NY (US)

( * ) Notice: Subject to any disclaimer, the term of this patent is extended or adjusted under 35 U.S.C. 154(b) by 604 days.

(21) Appl. No.: 11/127,787

(22) Filed: May 11, 2005

(65) Prior Publication Data
US 2006/0256140 A1 Nov. 16, 2006

(51) Int. Cl.
G09G 5/10 (2006.01)
(52) U.S. Cl. .................. 345/690; 345/3.1; 345/3.4; 345/691; 345/699
(58) Field of Classification Search .............. 345/76, 345/89, 690, 8, 180, 3.1, 3.2, 77, 691, 692, 345/699
See application file for complete search history.

(56) References Cited

U.S. PATENT DOCUMENTS

| | | | |
|---|---|---|---|
| 4,233,631 A * | 11/1980 | Mahler ................. 348/579 |
| 4,349,815 A | 9/1982 | Spooner | |
| 4,437,113 A | 3/1984 | Lee et al. | |
| 4,979,738 A | 12/1990 | Frederiksen | |
| 5,300,949 A | 4/1994 | Rodriquez | |
| 5,504,504 A | 4/1996 | Markandey | |
| 5,581,271 A | 12/1996 | Kraemer et al. | |
| 5,657,034 A | 8/1997 | Yamazaki | |
| 5,684,498 A * | 11/1997 | Welch et al. ................. 345/8 |
| 5,742,264 A * | 4/1998 | Inagaki et al. ............... 345/8 |
| 5,764,202 A * | 6/1998 | Welch et al. ................. 345/8 |
| 5,765,202 A | 6/1998 | Kusano et al. | |
| 6,023,296 A | 2/2000 | Lee | |
| 6,041,078 A | 3/2000 | Rao | |
| 6,160,846 A | 12/2000 | Chiang | |
| 6,263,022 B1 | 7/2001 | Chen | |
| 6,369,832 B1 | 4/2002 | McKnight | |

(Continued)

OTHER PUBLICATIONS

Cynthia Swain, Rick Oyler: "L-3 Communications' Link Simulation and Training Division Launches New Helmet Mounted Display System at I/ITSEC", Dec. 6, 2004, pp. 1-2.

Primary Examiner—Amr Awad
Assistant Examiner—Tony Davis
(74) Attorney, Agent, or Firm—Tiajoloff & Kelly (57) ABSTRACT

A system displays video to a user and has a display device with a field of pixels. It displays video to the user in the form of a series of discrete sequential frame images each made up of a first predetermined number of bit planes in which the pixels of the display are either off or have a color and intensity that is uniform over the field of pixels. The apparatus detects when a movement condition is present, such as rapid head movement or an object in the video crossing the display rapidly, in which condition the user's eye may tend to track across the display device at a rate at which perception of the video displayed may be reduced in quality, and it generates a condition-present signal when such a movement condition is detected. Responsive to generation of said condition-present signal, the apparatus causes the display device to display the frame images using fewer bit planes for each frame image than when said movement condition is not detected. Display with the original number of bit planes returns when the movement condition is over.

27 Claims, 6 Drawing Sheets

U.S. PATENT DOCUMENTS

| | | |
|---|---|---|
| 6,388,661 B1 | 5/2002 | Richards |
| 6,392,656 B1 * | 5/2002 | Someya et al. .............. 345/589 |
| 6,518,974 B2 | 2/2003 | Taylor |
| 2002/0071486 A1 | 6/2002 | Van Der Schaar |
| 2002/0168007 A1 | 11/2002 | Lee |
| 2002/0190923 A1 * | 12/2002 | Ronzani et al. ............... 345/50 |
| 2004/0066849 A1 | 4/2004 | Van Der Schaar |

* cited by examiner

DYNAMIC DISPLAY OPTIMIZATION METHOD AND SYSTEM WITH IMAGE MOTION

FIELD OF THE INVENTION

This invention relates to systems and methods for displaying video to a user, and especially to systems that involve displaying video images using sequentially-displayed bit planes.

BACKGROUND OF THE INVENTION

As is well known in the art, video is displayed to a viewer by displaying a series of still frame images sequentially on a display. The images are displayed one after another at a rate that is fast enough so that it appears to the normal human eye that the movement of objects in the video is smooth and continuous. In digital video, each frame image is made up of pixels that each have a respective color intensity for each of the primary display colors (red, green, and blue). The digital value of each primary color intensity of the pixel is frequently defined by eight bits of data, allowing for definition of up to 255 levels of intensity for each color, and an eight-bit color depth of a possible 255×255×255=16,581,375 colors, ranging from black (0,0,0) to white (255, 255, 255).

In some digital video displays, especially LCD or liquid crystal on silicon (LCOS) displays, each still frame image of the video is in fact a series of one-color component frames, called bit planes, that are displayed in a series and add up to the total color frame image. In each bit plane, the pixels are either on or off, and those pixels that are on in the bit plane are all on in the same primary color and intensity.

Each bit plane corresponds to a respective bit in the set of digital data defining the color of the pixels. For example, in some systems, the first bit plane displayed corresponds to the most-significant bit of the red image for all of the pixels at the maximum red intensity for the display, then the next bit plane at half that red intensity for the next most significant red bit, etc., down to the last red bit plane corresponding to the least significant red bit, wherein all the pixels have a red intensity of $\frac{1}{128}$ of the maximum red intensity. After the red planes, the green bit planes corresponding to the most significant to the least significant green pixel bits are similarly displayed, and then the blue bit planes.

The twenty-four bit planes are displayed so quickly that the total frame image display duration, i.e., the time from the start of the display of the first bit plane of the frame image to the end of the display of the last bit plane of that same frame, is less than the cycle time for display of each sequential image of the video, and the user normally sees only a moving video image, not individual bit planes or individual frame images.

In some environments, however, such as simulators for aircraft, bit-plane displays can be subject to some undesirable perception effects where the video being displayed has certain characteristics, or when the user's eyes pan or track across the image, so as to result in relatively rapid movement of the eye of the viewer relative to the objects seen in the displayed imagery.

In a simulator, usually there is a display that shows the user a real-time simulated out-the-window ("OTW") view from the aircraft, and possibly other objects like simulated head-up display imagery, all of which are created by an image generating computer system to give realism to the simulation. The display frequently is a head-mounted display in which the user wears a helmet fitted with a visor and a head tracking apparatus. An image generator transmits digital video appropriate to the simulation and to the direction that the head tracker indicates the user is looking. If the user turns his head rapidly, the head tracker detects this, and the image generator makes the scene displayed on the visor move rapidly to one side or another to conform to the new point of view.

As the user turns his head, however, his eyes move more or less continuously across the field of view, i.e., across the field of objects visible in the display device. The video, in contrast to the continuous movement of the eye, is a series is a series of still color images, each of which is made up of a series of frames, each of which is made up of a subset of still bit-plane images in which virtual objects in the simulated video display, like a passing aircraft, or the entire field of view when the simulated ownship is rotating or moving, is displayed as essentially in one stationary location from the start of display of the first bit plane to the end of display of the last bit plane of the given frame image.

Figure 1:
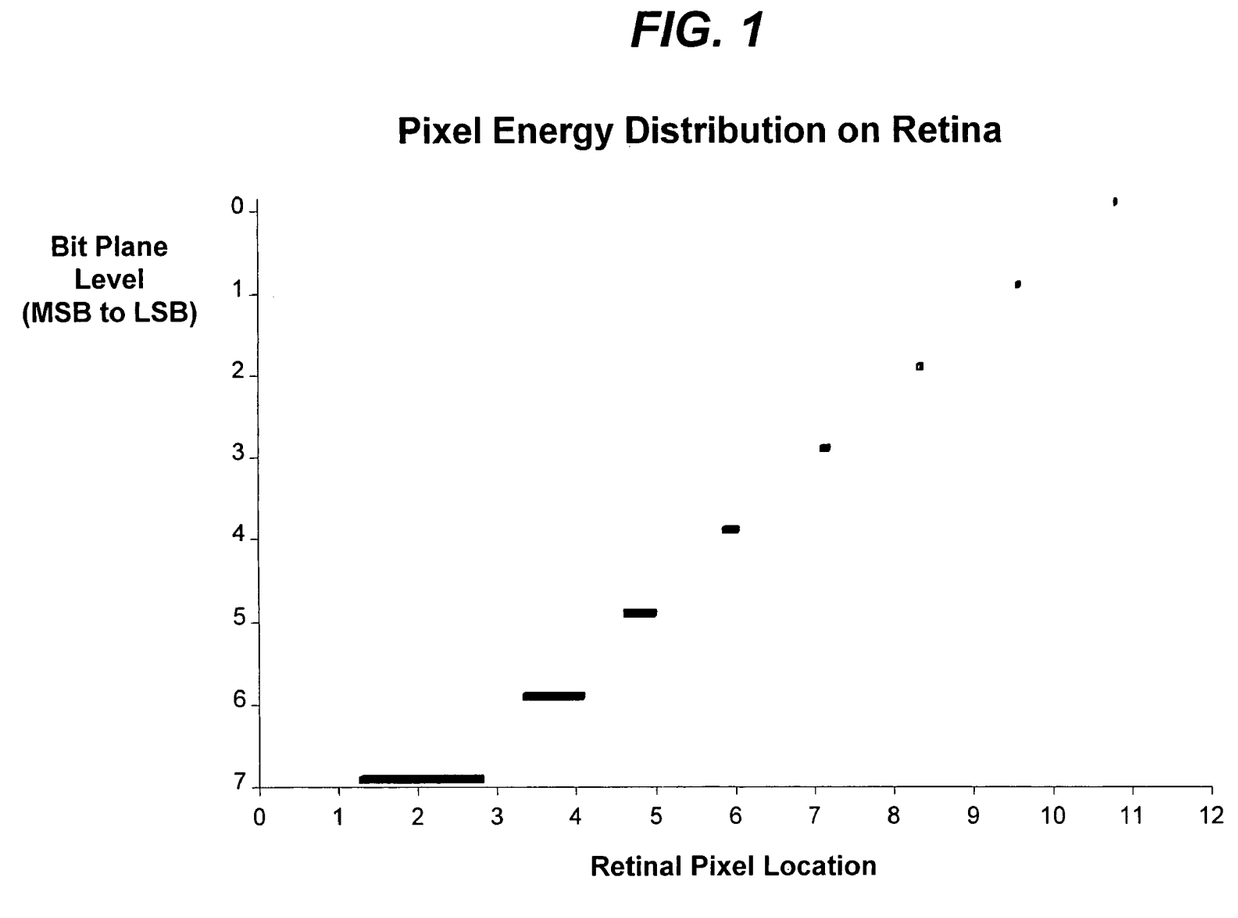
FIG. 1 is a diagram of the distribution of the light from an image in a bit plane display on the retina of a user as the eye tracks across the field of view.

As illustrated in by FIG. 1, the effect of this on the user's eye moving continuously relative to the object is that the image of an object in early bit planes strikes the retina of the user's eye in a different location compared to its location in later bit planes of the same frame image, resulting in a perceived separation into the colors of the different bit planes, which degrades the realism of the simulation.

Rapid movement of various types may produce the problem of tracking of the eyes across the display to give rise to a perceived separation of the first and last bit planes. The usual source of the problem is rapid head rotation. In addition, though, ownship rotations in a simulation may give rise to tracking of the eye relative to the displayed image that creates the separation of bit planes, as may high-speed movement of an object relative to the ownship.

SUMMARY OF THE INVENTION

It is therefore an object of the present invention to provide a method that reduces or avoids the problem of perceived separation of the bit planes, and allows for an improvement of the display of video displayed using bit planes. This object is accomplished by a method that comprises detecting when artifact-causing movement conditions are present in which problems with bit-plane displays occur, such as increased image movement or rapid head movement of the user, and then taking action to modify the displayed video so that the degradation of perception of the video is reduced. In the preferred embodiment, the displayed video is modified in response to the detection so that the frame image display duration for images subject to these movement conditions is shortened by reducing the length of time between the first and last bit planes of each frame image, and consequently reducing the perception of displaced separation of the bit plane images.

One method according to the invention comprises displaying a first portion of video to a user by displaying, using a display device, a first series of frame images each corresponding to a respective frame of the video, and each made up of a first predetermined number of sequentially displayed bit-plane images. These bit-plane images are all displayed in a first frame display period, defined as the duration of time from the beginning of the display of the first of the bit plane images of the frame image to the end of the display of the last of the bit planes of the frame image. The method further comprises detecting automatically in real time whether a movement condition is present that may give rise to a movement of the eye of the user relative to the frame images at a rate sufficient to create a degradation of the perceived quality of the video display. Responsive to a detection of the movement condition, a second portion of the video is displayed by displaying a second series of frame images that each correspond to a respective frame of the video and each are made up of a predetermined number of sequentially displayed bit-plane images that are all displayed in a second frame display period, defined as the duration of time from the beginning of the display of the first of the bit planes of the frame image to the end of the display of the last of the bit planes of the frame image. The second frame display period is shorter than the first frame display period.

According to a preferred embodiment of the invention, the display time of the images is reduced by reducing the number of bit planes displayed for each color of the frame image. If the color video is displayed as 8 red bit planes, 8 green bit planes, and 8 blue bit planes, the display time for the frame may be reduced by converting the video data to a lower color resolution (or lower color depth) where the frame is made up of 7 red bit planes, 7 green bit planes, and 7 blue bit planes. This results in a frame display duration that is 12.5% less than the normal video. It also results in a loss of color precision, or color depth, since the number of possible colors drops to $(2^7) \times (2^7) \times (2^7) = 2,097,152$ possible colors from the us $(2^8) \times (2^8) \times (2^8) = 16,777,216$ possible colors in the normal 24-bit color video.

In an alternate embodiment, the least significant bit plane for each color can simply be dropped, and the more significant seven bit planes for each color displayed.

If further shortening of the frame display duration is desired, the video may be converted and displayed using even fewer bit planes per frame, e.g., 6 bit planes per color, or 5 bit planes per color, or fewer. As the number of bit planes is reduced, however, the color resolution is reduced. Different degrees of shortening of the frame display time may be applied dependent on different detected levels of image movement that would tend to degrade perception of the display.

The detection of artifact-causing movement conditions is accomplished in the preferred embodiment by deriving a measure of image movement from the input of a head tracking apparatus, if one is present. It may also be determined by the image generator based on changes of parameters in the scene data, data defining the point of view of the user in the virtual world, or by a comparison of sequential images of the video, or portions thereof. The measure or indications of image movement are compared to pre-selected parameters for triggering the reduced display time images, and a signal indicating the presence, and preferably the severity, of the movement condition is produced.

It is further an object of the invention to provide for a return to normal video once the movement conditions indicative of possible video artifacts are no longer detected, video is again displayed using the usual number of bit planes per frame.

It is further an object of the present invention to provide apparatus for practicing the above-described method.

According to another aspect of the invention, a system is provided that comprises a display device displaying video to the user in the form of a series of discrete sequential frame images each being made up of a respective series of a first predetermined number of bit planes in which the pixels of the display are either off or have a color and intensity that is uniform over the field of pixels of the display device. An apparatus detects when a movement condition is present that may cause degradation of the quality of perception of the video by the user, and, responsive to detection of the movement condition, causes the display device to display the frame images using fewer bit planes for each frame image than when said movement condition is not detected.

Other objects and advantages of the invention will become apparent in the specification herein.

DETAILED DESCRIPTION

Figure 2:
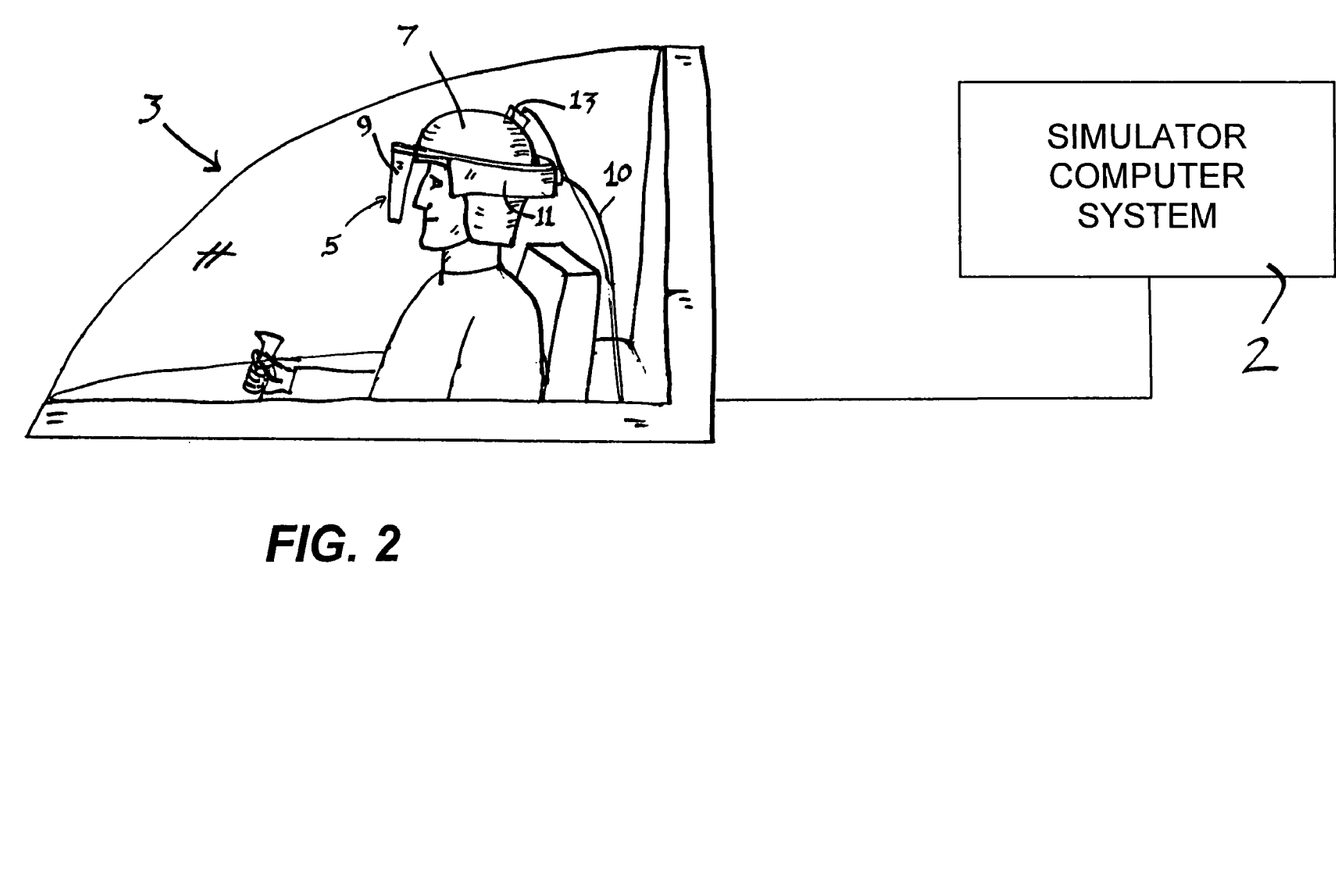
FIG. 2 is a diagram of a simulator system in which the invention may be applied.

As best seen in FIG. 2, in a simulator system for an aircraft, the user is seated in a simulated cockpit structure 3 that includes dummy controls and gauges similar to those in the real aircraft. A simulator computer system 2 controls the operation of the simulator system to make the simulation as realistic as possible. The simulator system also includes a display system that gives the user a simulated real-time out-the-window (OTW) view that is created by the simulator computer system 2, which includes an image generation system in the form of hardware and software that renders imagery video fast enough to keep up with the real-time operation of the simulation. The display may be a projection system, such as the system shown in U.S. Pat. No. 6,552,699, or any of a variety of other projection or display systems. In the preferred embodiment, the display system is a head-mounted display system 5 supported on a helmet 7 on the head of the user. The head-mounted display system 5 has a display device that includes visor screen 9 in front of the user's eyes and a housing 11 that supports therein image display electronics that transmit, project, or otherwise form, a moving real-time image on visor screen 9 so as to be seen by the user.

A head tracking apparatus 13 is supported on helmet 7. The head tracking apparatus 13 may be any of the various tracking systems well known in the art, such as an intersense accelerometer associated with the helmet of the user, or a motion sensor detecting the position and orientation of the user's head. Most preferably, the head tracker is an ultrasonic system, in which one or more ultrasonic signals are produced by a device on the user's helmet and detected by microphones in the simulator to detect the location and orientation of the user's head. Whatever the type of head tracker used, the head tracker system generates electrical signals related to the location, orientation and/or movement of the head of the user, and from these signals the simulator computer system determines the point of view to be used to render real-time imagery for display on the head-mounted display visor 9.

Figure 3:
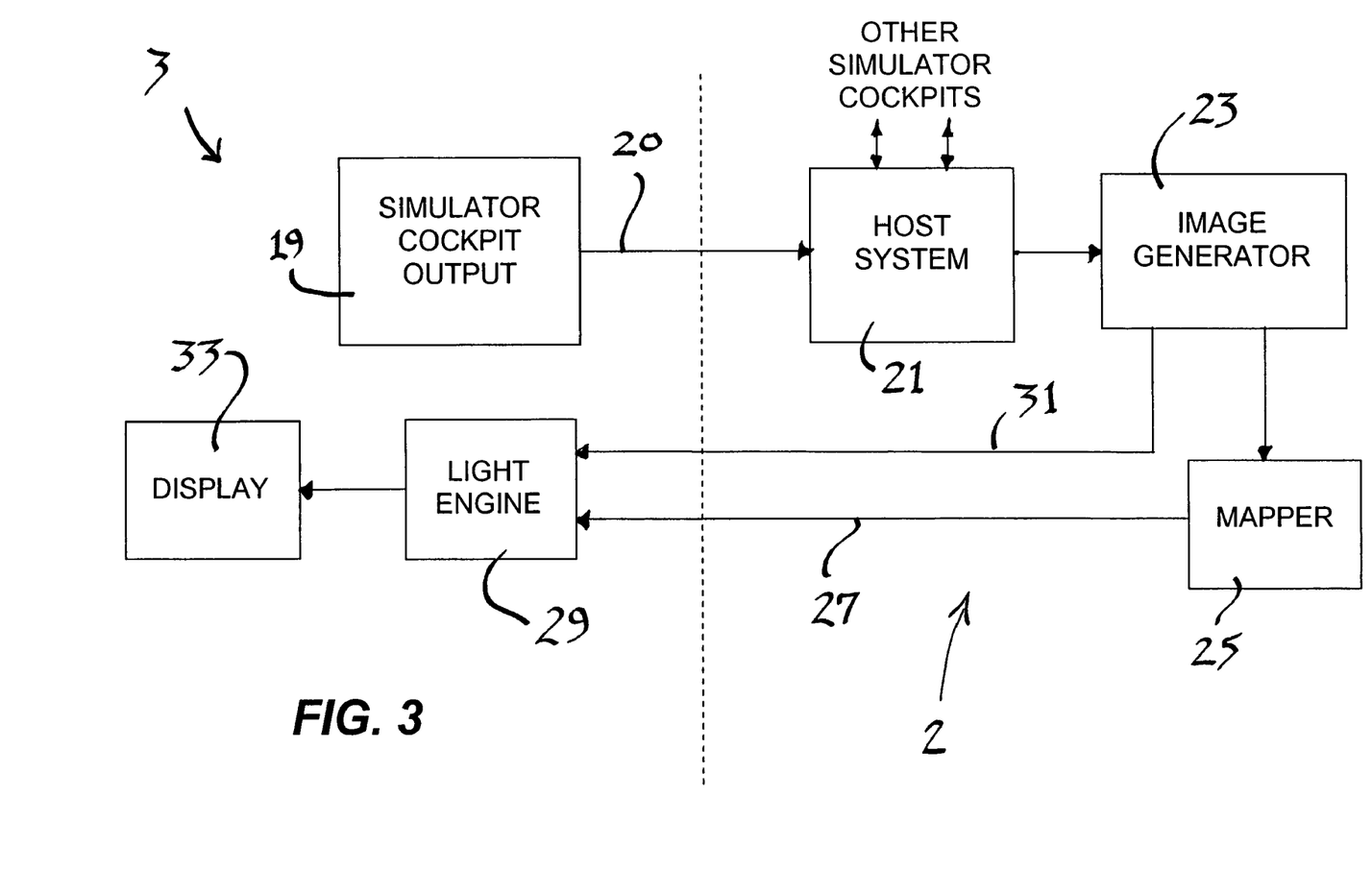
FIG. 3 is a schematic diagram of a simulator system employing the inventive method.

As best shown in FIG. 3, the cockpit 3 has an output circuit 19 (generally, a circuit board with connectors to one or more cables) that transmits various outputs from the cockpit 3, including the output of the head tracking apparatus, to a host computer 21 over communication line 20. Host computer system 21 receives the output from the simulated cockpit 3 and maintains data for running the simulation in the cockpit 3, and optionally one or more other cockpit simulator structures (not shown), which enable multiple trainees to practice simulated group sorties or other combined operations in a shared virtual world supported by the host computer 21.

The host system 21 also includes or communicates with an image generator 23, which may be understood to be software running on the same computer system 21 or separate hardware and software running in parallel, as is well known in the art. Typically, the host computer computes data relating to the attributes of the ownship simulated by cockpit structure 3, such as position, orientation, roll, pitch, etc., and communicates this data to the image generator. The host computer also transmits data derived from the output of the head tracking device to the image generator 23 so that the image generator is able to determine therefrom the point of view for which it is rendering the OTW scene.

The image generator 23 contains or has access to an electronically stored computer accessible database containing data defining the scene and other virtual attributes of the simulated vehicle environment and situation. From this scene data, which is maintained in real time to reflect constant changes in the virtual world being simulated, and from the user's time-varying viewpoint and viewing direction in the virtual world, the image generator 23 renders the serial frame images for the OTW scene and any other imagery shown to the user (e.g., head-up display symbology), and transmits these frames as continuous digital color video. This digital video signal is a series of frame images configured to be displayed at an update cycle of 60 Hz, so as to appear to the user to be a normally moving OTW scene. Each of the frame images is preferably a set of digital data made up of three eight-bit data fields per pixel, with each data field representing the intensity of a respective primary color of the display, i.e., red, green or blue, for the associated pixel. In the preferred embodiment, the digital video is configured based on a field of 1280×1024 pixels.

The frames produced by the image generator are conceptually rectangular. The display device, however, whether a projector or a head mounted display, is often not a rectilinear display. Accordingly, the video signal in the preferred embodiment is sent from the image generator 23 to mapper circuitry 25, which configures the video to prevent distortion thereof on the display device. Particularly preferred for this purpose is a mapper sold under the name "Mercator" by SEOS Ltd., a company with having an office in West Sussex, U.K. This mapper 25 is an image distortion correction system that allows fixed matrix projectors to be used in curved screen applications, or also in other displays with geometries that are in some way distortional. It receives the video stream at full 24-bit color depth, 'warps' the image and delivers a modified 24-bit color depth video via communication line 27 to a bit-plane-sequencing display controller or light engine 29 in the cockpit structure 3. The light engine 29 receives the video and controls display device 33 so as to appropriately display the video received along line 27, as will be described below.

In the preferred embodiment, the image generator 23 also detects whether there is a motion condition that may produce, or is likely to produce, a degradation of perception of the video displayed. When such a movement condition is detected, the image generator transmits a condition-presence signal to light engine 29 along communications line 31, which is shown as independent of video transmission line 27, but alternatively may be combined with the transmission along the video line 27 if preferred. According to the preferred embodiment, the signal is composed of three bits that represent a number from zero to seven, and is used to indicate the severity of the movement condition detected, with zero indicating no movement condition being present.

The detection of the movement condition presence is performed by image generator 23, although it may also be performed by other components of the system, depending on how the condition is detected.

In the most preferred embodiment, the movement condition is detected based on a determination derived from the output of head tracking system 13 of the rate of rotation of the user's head. In a head mounted display, the rotation of the head of the user causes the imagery on the visor 9 to shift across the display to provide the proper view, and when the rotation is fast and larger in displacement, such as when the user turns quickly from looking to the left to suddenly looking to the right, the imagery displayed also moves rapidly. In a bit-plane display, however, the movement of the frames of the imagery is not continuous, but rather sequential still frame images each composed of a subset of still bit plane images in each of which the virtual objects in the video are effectively stationary during the entire frame display period, during which time the user's point of view is tracking continuously across the virtual scene. The result is a potential of perceived degradation of the video during the period of movement, as has been discussed above. Head rotation preferably should be understood to mean rotation about any axis, whether the movement of the head is up and down or lateral, or a combination of the two.

The calculated or detected rotation of the user's head is compared with one or more predetermined threshold values to detect the motion condition. If the head rotation rate exceeds the threshold rate value, a motion condition is detected and a signal indicative of its presence is output to the light engine 29. In a system where two or more incrementally increasing threshold values are used, when the lowest threshold is exceeded, a signal corresponding to 1 is output. If the next higher threshold value is exceeded, then the condition presence signal output is set to 2, and so on, for as many levels of movement-condition severity are desired.

In the preferred embodiment, a threshold level of head rotation that triggers a detection of the movement condition is 20 degrees/second. A higher level of rotation is detected as the rate of head rotation passes 40 degrees/second, and the highest level detection is in the area of 60 degrees/second. The output signal is set to values of 1, 2 and 3, corresponding to reaching the threshold values of 20, 40 and 60 degrees/second. These threshold limits, however, may be adjusted, since different display devices may have different degrees of sensitivity or physical parameters that may require greater or lesser sensitivity for detecting the condition.

In addition to head rotation, there are other aspects of the video imagery itself that may tend to cause degraded perception of the video. For example, even when the user's head is stationary, the OTW scenery displayed might move rapidly one way or another due to rapid ownship movement, for example by a sudden dive or bank of the user's ownship in simulation. In an alternate embodiment, the image generator 23 detects such a rapid imagery shift based on a calculated value of rotation or other movement of the ownship from the host system, or a calculated change in viewpoint from which the video imagery is being rendered, or based on an analysis of the video itself to detect its rapidly shifting point of view, such as by comparison of sequential frame images. As with detection of the movement condition based on head rotation data, the data value being tested, e.g., virtual ownship rotation or a numerical expression of the shifting of the video imagery, is compared with one or more predetermined threshold values each representing a respective level or degree of movement condition, and a signal is output to the light engine 29 indicating the presence of the condition, and preferably the severity level of the condition, where more than one threshold is used.

In addition to changes in viewpoint due to real or virtual changes in viewpoint, the video may have characteristics that are artifact-causing, such as simply containing objects moving in it across the display that may cause the user's eye to track them and cause the perception of separation. Such an object might be, for example, a simulated virtual aircraft flying near the user's ownship that suddenly moves with respect thereto at a high enough speed that the user's eye tracks it continuously, and sees color separation due to the object being displayed as effectively stationary in the several bit-planes of each frame over the frame display period during its rapid movement. The image generator may also be configured to analyze the scene data or the video frame output to detect if there are one or more rapidly moving virtual objects in the field of view, and to identify a motion condition of an appropriate level when such an object or objects present.

It will be understood that these methods of detecting the movement condition are especially applicable in the system environment of a head-mounted digital display where the individual frames are displayed as a series of bit planes. At the same time, however, benefits of the invention may also be derived for other types of display that are not head-mounted but in which frames are displayed as serial bit planes, such as an LCD projected OTW display.

In the preferred embodiment, the light engine 29 receives the configured video from mapper 25, and also the movement condition signal from image generator 23. From these signals, light engine 29 controls the display of the video on display device 33, which in the preferred embodiment is the display electronics and visor 9 of the head-mounted display. The display device preferably includes a microdisplay that may be LCD, LED, LCOS, or any of a number of digital microdisplay devices, such as micromirror displays (DMDs) made by Texas Instruments, that use bi-stable pixel elements to form images as display of a series of bit planes for each frame. The output of the light engine 29 is a direct electronic control through the display driver of the on or off condition of all the bi-stable pixel elements in the display device 33.

Figure 6:
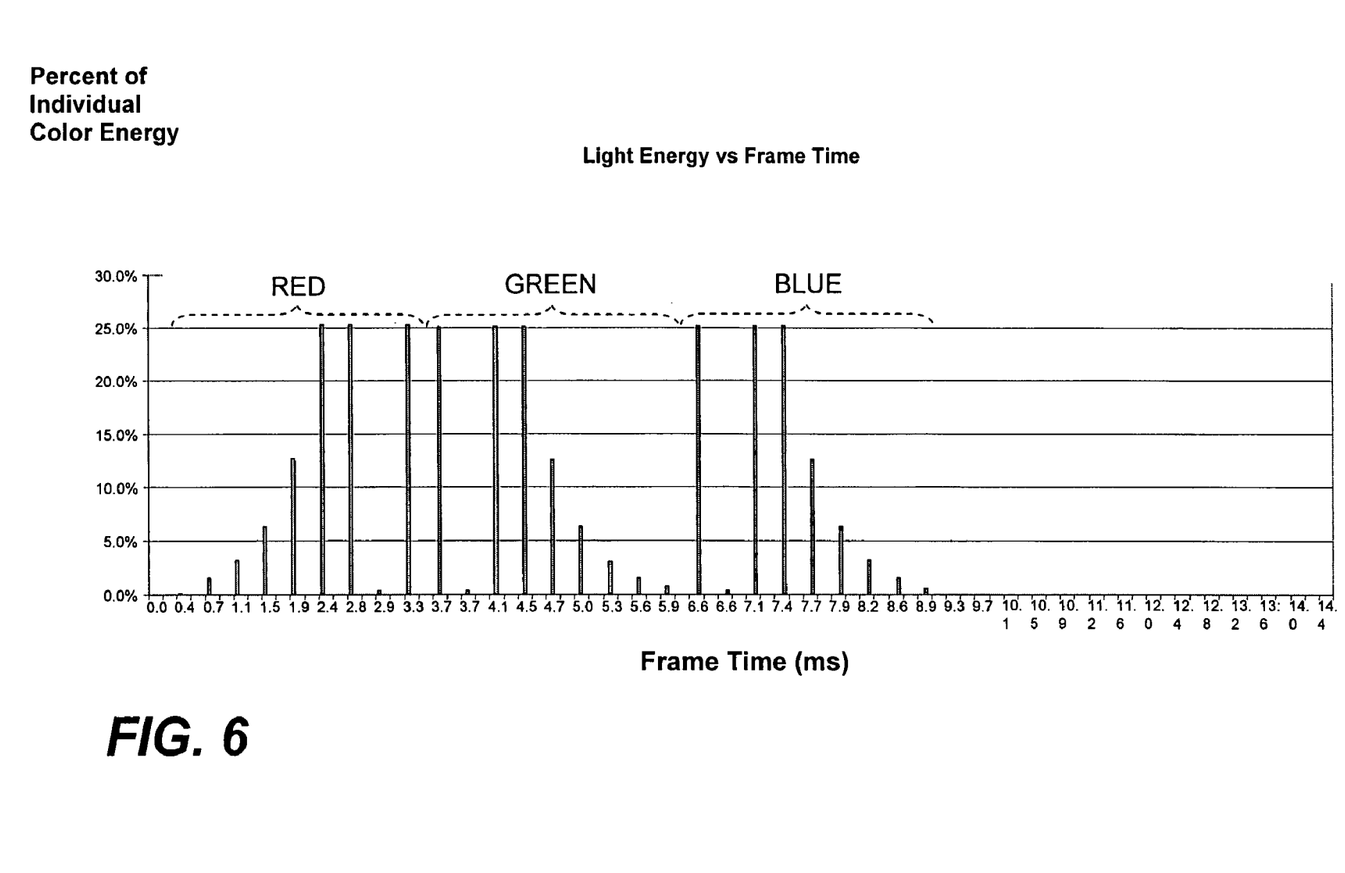
FIG. 6 is a diagram of the bit plane display produced in a display device having a bit-plane sequencing controller.

Particularly preferred for the display controller and display device of the invention is a modified combination light engine and microdisplay similar to that sold by CRL Opto Ltd., a company having a place of business in Dunfermline, Scotland, in which the light engine controls the order in which individual bit planes are displayed on an LCOS microdisplay attached thereto, so that, for example, a low-significance-bit red bit plane may be displayed first, followed by the most significant red bit plane, and then a red bit plane corresponding to another lower significant bit, in whatever order is desired, with the totality of the bit planes adding up to the frame image. An exemplary series of bit planes that can be displayed by such a light engine is shown in FIG. 6. In this particular display scheme, the most significant bit of the digital data for each color of the pixels is displayed by display of the same bit plane twice for that bit to increase the total color of the displayed frame image, resulting in nine bit planes displayed for each color in FIG. 6. The first and last bits displayed are respectively the least significant bits for the colors red and green. It will be understood, however, that the CRL Opto product is modified to perform additional functions as required by the present invention, as described below.

The present invention addresses the problem of perceived degradation or color separation in a bit-plane display during a period of high movement of the user's viewpoint or objects in the OTW scene by reducing the frame display period, meaning the duration between the beginning of the display or illumination of the first bit plane of a given frame image and the end of display or illumination of the last bit plane of the frame image.

Figure 4:
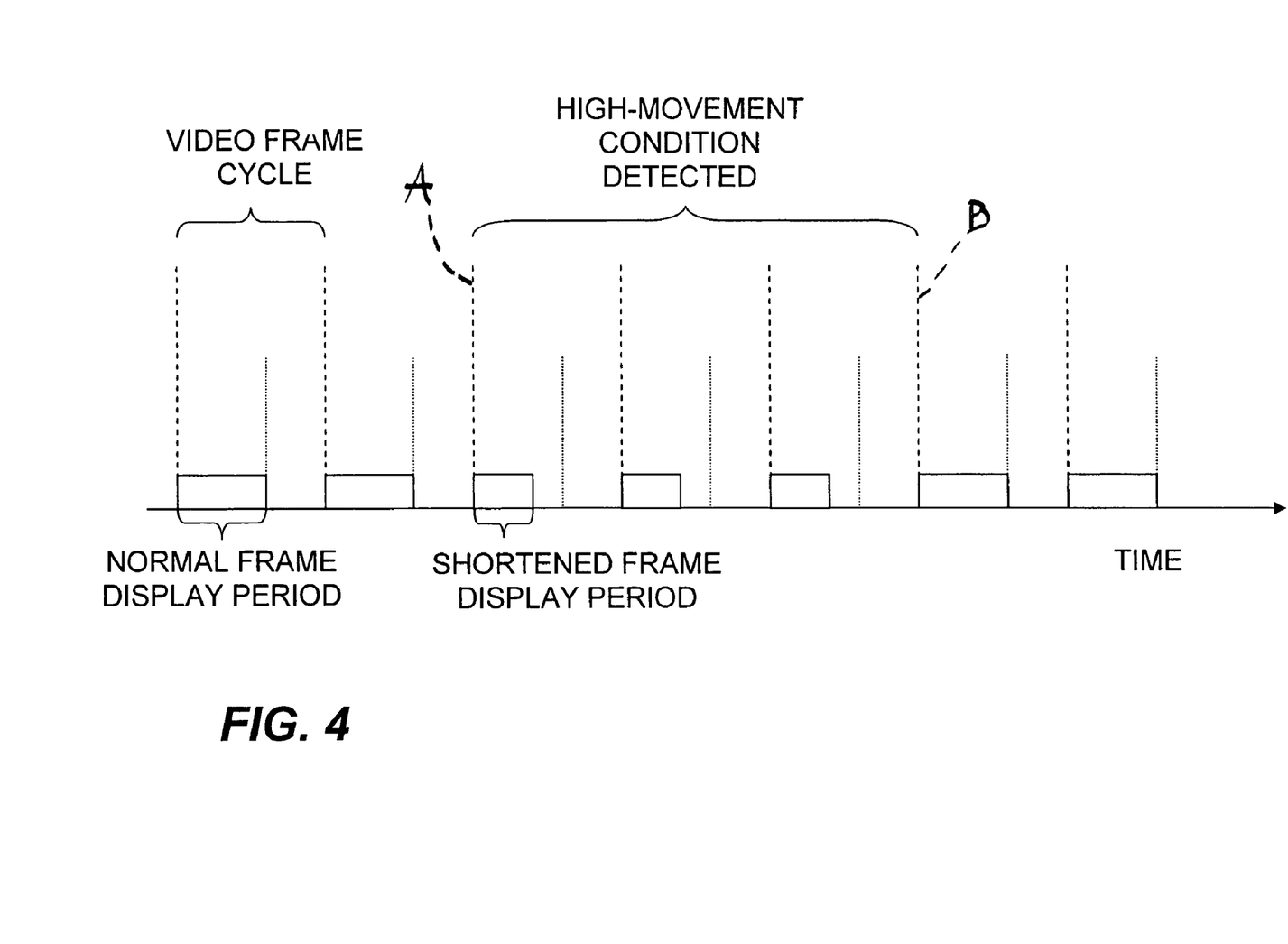
FIG. 4 is a timeline diagram showing operation of the system and method of the invention.

As illustrated in FIG. 4, the video is displayed as a series of frame images, one displayed for each video frame cycle, which in the preferred embodiment is 60 Hz. Where a movement condition is not detected, as, e.g., when the user is not moving his head very rapidly, or when the OTW scene shown to the user is not moving rapidly relative to the display screen or to the user's eyes, etc., the bit planes of the frame are displayed with the duration between the first and last bit planes being a normal frame display period, as indicated.

The image generator automatically and continuously or cyclically checks in real time whether a high-movement condition is detected, as described above, that might degrade the perception of the video. When such a condition is detected (point A in FIG. 4), display of the video is modified such that the duration between the first and last bit planes of the frame is a shortened frame display period, as indicated. This improves the separation effect perceived by the user because, for movement at a high rate, the perceived displacement distance between the first and last bit planes is reduced with the reduction of the space of the time between the display of the first and last bit planes.

When the high-movement condition is no longer detected (point B in FIG. 4), the video is again displayed in its normal mode, where the duration between the start of the first bit plane and the end of the last bit plane is the normal frame display period.

Figure 5:
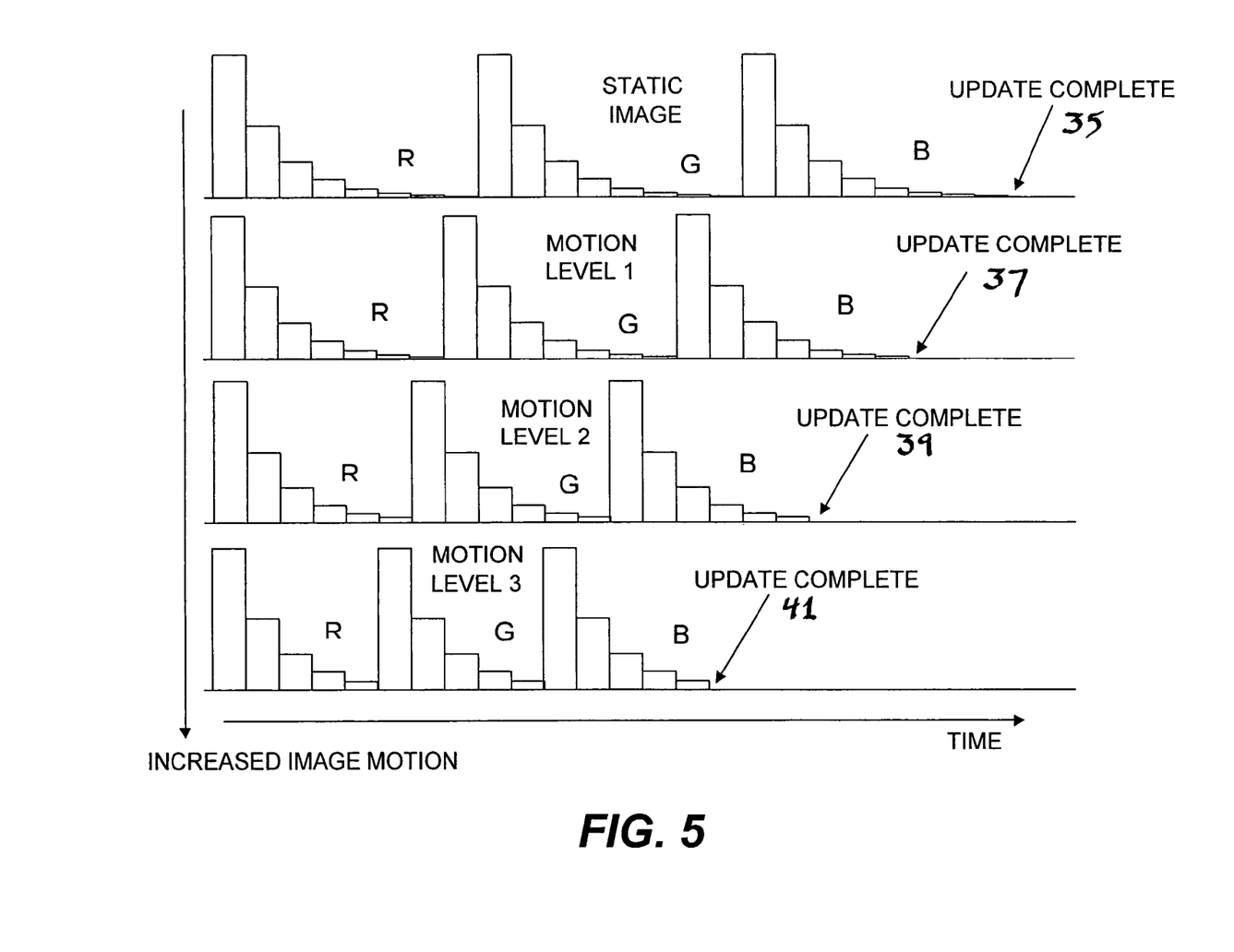
FIG. 5 is a detailed diagram illustrating a shortening of the frame display times for varying levels of detected motion.

The frame display period is shortened during movement conditions as illustrated in FIG. 5. When the image generator 23 detects a motion condition that may reduce the quality of the perception of the display, it outputs a signal indicative of the presence of the condition, and preferably also indicative of the severity of the condition, e.g., increasing severity in motion levels 1, 2 and 3 for head rotation rates above the lowest threshold rate value, a middle threshold rate value, and a highest threshold rate value. In normal mode for a generally static image, the image generator outputs no signal, or a zero, and the display is, in the example shown, a typical digital color display of 8 bit planes per color, ranging from the highest peak (or most-significant bit) to the lowest peak (or least significant bit) for each color, with a total of 24 bit planes. Hardware limitations require that each bit plane be displayed for a minimum amount of time, and the full image, with all bit planes, is displayed in a hardware-limited minimum display period indicated at point 35, where the static image update for the frame image is complete.

When motion level 1 is detected, the image generator outputs a 1, and the light engine 29 converts the video received along line 27 to be displayed in fewer bit planes. As seen in FIG. 5, in the preferred embodiment, a motion level 1 results in a display of the video using seven bit planes per color instead of eight. This results in a shortening of the frame display period so that the frame update is complete by time limit 37. It also results in a reduction of the color depth and the range of possible colors of the display from 16,581,375 to about 2 million possible colors, but during a brief period of rapid movement this change in color depth should not be detected by the user.

The reduced number of bit-planes may be produced by the light engine 29 in a variety of ways. In one embodiment, each frame of the displayed video is derived by dropping the last least-significant bit of each set of eight bits defining the red, green and blue intensities of each pixel, and as a consequence, dropping out display of the least significant bit plane for each of the three colors.

Alternatively, the video frames from mapper 25 are converted by rescaling the number value of the color intensity for each pixel from eight bits to a field of seven or fewer bits, as applicable to the degree of shortening of display time applied, with rounding of the resulting value up or down at the last bit as appropriate.

If the image generator 23 determines that the movement condition is more severe, it outputs a number related to the severity of the condition, for example, a 2, 3 or higher number as the signal to the light engine 29, and the light engine displays the video with fewer bit planes, resulting in an even more abbreviated frame display period. As seen in FIG. 5, a motion level 2 condition results in the display being made up of six bit planes per color per frame, with an even shorter display period updating the frame within the time indicated at 39. Similarly, detection of a motion level 3 condition will result in a display using only five bit planes, update completed at a much shorter time 41. Even fewer bit plane may be used, dependent on the acceptable quality of the simulator.

The bit plane values for these higher motion levels may be also derived from the video received by light engine 25 by dropping the least significant bit planes to reduce the number of total bit planes for the frame, but are most preferably derived by scaling down the illumination value for each color for the pixel down to a number of bits equal to the number of bit planes that are to be displayed, rounding the value to the nearest scaled binary number. For example, if the red illumination were defined by eight bits as $10101111_2$ (meaning decimal 175), the number would be scaled to a five-bit value by dividing by 8, to yield 21⅞, and rounding up to 22, expressed in binary as $10110_2$.

As with the change to 7-bit color depth, there is a loss of color depth in these reduced bit plane displays. Coupled with a rearrangement of the bit planes as in FIG. 6 such that the first and last bit planes are the lowest in intensity, the effects of movement on the display are greatly reduced, and the quality of the simulation is enhanced.

The image generator automatically tests for the presence of the motion condition and its severity at least every frame display cycle (e.g. at 60 $H_z$). When the motion condition is no longer detected as present, the condition signal is stopped or set to zero, and the light engine 29 returns to normal display of the video, e.g., eight bit planes per color. If the motion condition is detected as having dropped in severity, then the condition output is dropped to a lower value, and the display is changed to be made with the number of bit planes corresponding to that motion level.

The output signal from image generator 23 to light engine 29 may alternatively be a three-bit value representing the color depth to display the video in. For example, normal static image video would be displayed in 8-bit color depth responsive to a binary $111_2$, 7-bit color depth displayed responsive to a binary $110_2$, 6-bit to a $101_2$, 5-bit to a $100_2$, and so on.

As an alternative to the above described system, one of skill in the art will be able to accomplish similar benefits by incorporating aspects and functions of the hardware in software functions of the image generator. For example, the image generator may internally detect the motion level of the video and calculate a lower color-depth version of the video, and transmit that for compressed display instead of providing that function in the light engine.

It will be understood that the invention herein extends well beyond the embodiments of the disclosure, and the terms used in this specification should be understood to be language of description, not limitation, as those of skill in the art with this specification before them will be able to make changes and modifications therein without departing from the scope of the invention.

What is claimed is:

1. A method of displaying to a user video made up of a sequence of frames, said method comprising:
   displaying a first portion of said video to a user by displaying using a display device a first series of frame images each corresponding to a respective one of said frames and each being made up of a first predetermined number of sequentially displayed bit-plane images that are all displayed in a first frame display period defined by a duration of time from the beginning of the display of the first of said bit planes of the frame image to the end of the display of the last of the bit planes of the frame image;
   detecting automatically in real time whether a movement condition is present that may give rise to a degradation of the perceived quality of the video display;
   displaying using said display device, responsive to a detection of said movement condition, a second portion of said video by displaying a second series of frame images each corresponding to a respective one of said frames and each being made up of sequentially displayed bit-plane images that are all displayed in a second frame display period defined by a duration of time from the beginning of the display of the first of said bit planes of the frame image to the end of the display of the last of the bit planes of the frame image;
   wherein each frame image of said second portion of said video is made up of a second predetermined number of bit plane images that is fewer than said predetermined number of bit plane images of the first portion of said video; and
   wherein said displaying of the second portion of said video takes place after completion of the displaying of the first portion of video; and
   said second frame display period being shorter than said first frame display period.

2. The method of claim 1 wherein the presence of said movement condition is detected based on a measure of a rate of rotation of the head of the user by comparing said measure of the rate of rotation of the head of the user to a preselected threshold rate value and then determining presence of the movement condition when the measure of the rate of rotation is greater than or equal to said threshold rate value.

3. The method of claim 2 wherein said measure of the rate of rotation of the head of the user is derived from a signal from a head tracking device detecting movement of the head of the user.

4. The method of claim 1 wherein the presence of said movement condition is detected based on an analysis of said video to determine when said video has a characteristic that tends to cause tracking of the eye of the user across the frame images thereof.

5. The method of claim 1 wherein the video is transmitted to a display controller that transmits electrical signals that control the display device that displays the frame images to the user.

6. The method of claim 5 wherein said display controller modifies the video for display dependent on an indication of whether the movement condition is present such that the number of bit planes making up the frame images displayed and the frame display period are reduced when the movement condition is detected.

7. The method of claim 6 wherein, when said movement condition is detected, a signal indicative of the presence thereof is sent to the display controller.

8. The method of claim 7 wherein the video is transmitted to the display controller as a digital video signal in which each pixel of each frame has a color defined by a predetermined resolution number of bits, and wherein the second predetermined number of bit planes in the second portion of video displayed by the display controller responsive to said signal indicative of the presence of the movement condition is less than the predetermined resolution number of bits.

9. The method of claim 1 wherein said method further comprises generating said video using a computerized image generating system.

10. The method of claim 1 wherein said frame images are displayed on an LCD display device.

11. The method of claim 1 wherein said frame images are displayed on a head mounted display device.

12. The method of claim 1 wherein the detecting of the movement condition includes detecting at least two levels of said movement condition where each level represents a different degree of potential degradation of perception of the video by the user, and, responsive to detection of a first lower level of said movement condition, said video is displayed in frame images having more no more than said second predetermined number of bit planes, and responsive to a detection of a second higher level of movement condition, said video is displayed in frame images having no more than a third predetermined number of bit planes that is less than said second predetermined number of bit planes.

13. The method of claim 1 wherein the first predetermined number of bit planes is 24 bit planes, and the second predetermined number of bit planes is 21 or fewer bit planes.

14. The method of claim 1 wherein the second portion of video is derived by converting video digital data defining the frames to scaled data with a lower resolution.

15. The method of claim 1 wherein the second portion of the video is derived by dropping the least significant bit data from video digital data defining the frames of the video.

16. The method of claim 1 wherein the display is a color display and the video is 24-bit color video, and each of the bit planes is a field of on or off pixels that is all red, all blue or all green.

17. The method of claim 1 wherein, when said movement condition is no longer detected, a third portion of said video is displayed after the display of the first and second portions of said video by displaying a third series of frame images each corresponding to a respective one of said frames of said video and each being made up of the first predetermined number of sequentially displayed bit-plane images.

18. A system for displaying video to a user, said system comprising:
 a display device having a field of pixels and displaying video to the user in the form of a series of discrete sequential frame images each being made up of a respective series of a first predetermined number of bit planes in which the pixels of the display are either off or have a color and intensity that is uniform over the field of pixels;
 an apparatus detecting when a movement condition is present that may cause a degradation of perception of the video displayed, and, responsive to detection of said movement condition being present, causing the display device to display the frame images using fewer bit planes for each frame image than when said movement condition is not detected; and wherein said frame images that are displayed using fewer bit planes are displayed after the display of the frame images made up of said first predetermined number of bit planes; and wherein the bit planes of each of the frame images are displayed sequentially, each for a minimum amount of time before the respective next bit plane is displayed, such that a frame display time period between the display of first and last bit planes of each of said frame images displayed using fewer bit planes is shorter than a frame display time period between the display of a first and a last bit plane of each of said frame images made up said first predetermined number of bit planes, whereby the degradation of perception of the video is reduced.

19. The system of claim 18, and further comprising a head tracking apparatus detecting a position, orientation or movement of the user's head and generating data indicative thereof, said movement condition being detected when the data from said head tracking apparatus indicates a rate of rotation of the head of the user that is greater than or equal to a predetermined threshold value.

20. The system of claim 18 wherein the apparatus includes an image generator generating said video frame images, and wherein the apparatus detects presence of said movement condition when the video output has a characteristic that tends to make the eye of the user track a virtual object across the display device.

21. The system of claim 18 wherein the video is supplied as digital color video defining sequential frames of pixels where each pixel has a color definition data value defined by three sets of bits, each set of bits corresponding to a respective display color of the group consisting of red, blue and green;
 said apparatus displaying said series of bit planes as each red, green or blue, and said apparatus reformulating the color definition data value of each pixel with at least one bit fewer in each of said sets of bits and causing the display device to display the frame images using a reduced number of bit planes corresponding to said reformulated color definition.

22. The system of claim 21 wherein said reformulating of the color definition includes converting said color definition data value to a reformulated data value scaled proportionately to a possible range of values that can be stored in the reduced number of bits allotted to the reformulated data value.

23. The system of claim 18 wherein said condition present signal contains a level value derived by a calculation of a degree of severity of said motion condition, and said apparatus displaying said frame images with a first number of bit planes per frame image when said level value has a first value, and displaying said frame images with a second number of bit planes per frame image that is less than the first number when said level value has a second value different from said first value.

24. The system of claim 18 wherein said apparatus detects when the movement condition ceases to be present, and, responsive to said detection that the movement condition is no longer present, displaying the frame images on the display device with said first predetermined number of bit planes for each of said frame images.

25. The system of claim 18 wherein said display device is a helmet-mounted display system.

26. A system comprising:
 a display device supported on the head of a user and displaying images to the user on a visor using bit planes of three primary colors;

a head tracking apparatus providing a head tracking signal containing data from which the position, movement or orientation of a user's head can be derived;

an image generator receiving said head tracking signal and, based at least in part thereon, generating real-time digital video comprising sequential digital frame images of pixels wherein each pixel has a color defined by at least eight bits per primary display color;

said image generator continually detecting based at least in part on said head tracking signal whether the head of the user is rotating at a rate of rotation that has reached or exceeded a threshold rate value, and generating a condition-present signal when said rate of rotation has reached or exceeded said threshold rate value;

the display device having a circuit receiving the video and the condition-present signal from the image generator;

said display device displaying the current frame image of the video on said visor in a first color-depth when the condition present signal is not received, and displaying the current frame image in a second lower color depth and with fewer than said first number of bit planes when the condition present signal is received; and wherein each of the frame images is displayed within a respective frame display time period, and wherein the frame display time period of the frame images in the second lower color depth is less than the frame display time period of the frame images of the first color depth.

27. The system of claim 26 wherein the image generator has a mapper modifying the video for the display device generator and the light engine.

* * * * *